Jan. 14, 1958 H. B. HÅARD 2,820,138

RELAY STATION FOR TRANSMITTING FREQUENCY MODULATED SIGNALS

Filed Oct. 6, 1954

INVENTOR
HANS BERTIL HÅÅRD
BY [signature]
ATTORNEY 2,820,138

Patented Jan. 14, 1958

2,820,138

RELAY STATION FOR TRANSMITTING FREQUENCY MODULATED SIGNALS

Hans Bertil Håård, Hagersten, Sweden, assignor to Telefonaktiebolaget L M Ericsson, Stockholm, Sweden, a corporation of Sweden Application October 6, 1954, Serial No. 460,645

Claims priority, application Sweden October 19, 1953

2 Claims. (Cl. 250—15)

Figure 1:
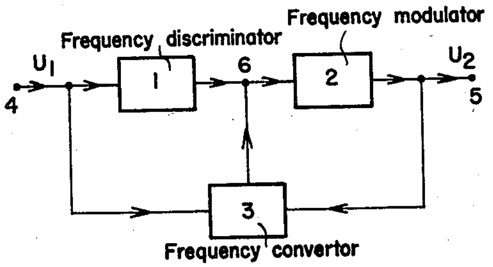

Links for frequency modulated signals have become important during recent years, as they seem to present the way most practicable to obtain wide signal bands for example for television or multi channel telephony with several hundreds of channels. One of the reasons for this is that the microwave tubes, for example klystrons, are easy to frequency modulate, other modulation methods encountering practical difficulties in the execution or requiring large band width on the high frequency side with limiting of the useful signal band width.

A difficulty in connection with frequency modulation is however, that it is very sensitive to distortion. Thus the requirements are very high for the modulation- and demodulation circuits regarding the linearity and for the high- and intermediate frequency sides corresponding requirement for low phase- or transit time distortion. The amplitude distortion i. e. the frequency dependance of the amplitude curves can generally be overcome by using a limiter. Particularly in long distance communications with many relay stations the requirements for distortionless relay stations are very high, since the distortion from the different relay stations are cumulative and the total distortion effect for the whole communication has to be below fixed values. The distortion causes an intermodulation between the different frequency components in the video band, i. e. the television signal or the telephony channels located at different frequencies, so that new frequencies, mainly of the type $f_1—f_2$ or $2f_1—f_2$ are formed. These new frequencies are disturbing and have the character of a noise, distributed over the video band.

A television signal is insensitive to generally rather great intermodulation noise without detriment to the quality, the requirements for telephony being considerably greater. This finds evidently expression in the functions of the existing links. Thus only a small part of the available frequency band can be used for telephony channels, if the intermodulation noise will not be too great. Hence, it is obvious to try to improve above everything the linearity of the relay stations, so that a great part of the available video band can be used for telephony.

A transmitter in a frequency modulated link comprises in the most simple case a video amplifier and a modulated transmitting tube, for example a reflex klystron. A receiver may consist of a converter, an intermediate frequency amplifier, a frequency demodulator and possibly a video amplifier. A relay station can then be formed simply by connecting a receiver to a transmitter. A relay station will then, except the high frequency parts i. e. aerials, feeders and filters if any, consist of converters, intermediate frequency amplifiers, demodulator, video amplifiers and modulated transmitter. The sources of the intermodulation are found in the phase distortion of the high- and intermediate frequency parts and in the non-linearities of demodulator, video amplifier and transmitter.

Certain distortion sources can be eliminated by transforming the signal to high frequency after the intermediate frequency amplifier, thus without its demodulation to video frequency. In such a manner the demodulator, the video amplifier and the modulated transmitter and the non-linearities in said components are avoided. This method is used in most existing links.

Said method requires, however, that the relay stations are provided with transmitter amplifier, as the second mixing i. e. the transformation from intermediate- to high frequency, must take place in a low level in order to be linear. Triodes, klystrons with two cavities or travelling wave tubes can at present be used as transmitter amplifiers. Triodes can hardly be used over 3 .1000 mc./sec. and klystrons with two cavities cannot combine band width with high amplification. The travelling wave tubes may be the technically best solution over about 3 .1000 mc./sec. There are, however, two rather fundamental disadvantages in connection with the travelling wave tubes. One is that the phase difference between output and input signal is amplitude dependent, and in order to avoid that an amplitude variation, dependent upon for example selective fading or amplitude distortion, produces a high phase distortion, it is necessary to have very strict limiting. The other disadvantage is, that the life of the travelling wave tubes is rather short. This is mainly due to the fact that the acceleration voltage must be rather high, at least about 2 kv., and that there is a focusing magnetic field, which causes that all positive ions along the electron beam impinge with great energy upon the cathode. Its life will then with the present cathode constructions be rather limited.

With this alternative the non-linearity in the demodulator, video amplifier and transmitter is avoided, but there is instead a complication with a second converter and transmitter amplifier. The advantage is not so great either, as with the best available constructions of demodulator and transmitter the dominating intermodulation-cause is the phase distortion in the intermediate frequency amplifier. Another phase distortion in the additional high-frequency-circuits in the transmitter amplifier is also to be expected.

In order to avoid also the phase distortion in the intermediate frequency amplifier, and also to simplify the relay station where may be an alternative with only high frequency amplification in three or more travelling wave tubes. The relay station then would consist of a tube with low noise as pre-amplifier, an intermediate amplifier with one or more tubes with high amplification and an output amplifier with one power valve. One cannot, however, work with received and emitted signal of the same frequency, and therefore a transformation anywhere in the relay station must be arranged, which, however, is rather simple in the travelling wave tubes. A considerably more complicated problem is, however, the limitation of the amplitude, possibly in combination with an automatic gain control. These are necessary to smooth fading and gain variations and especially to prevent phase distortion in the travelling wave tubes. Further the limited life of the tubes must be considered, and therefore said alternative does hardly present an economically more advantageous solution than that of the preceding alternative.

There are, however, other procedures for example a reduction of the distortion by negative feed-back or by a compensation- or smoothing procedure. A reduction of the phase distortion by phase correction and of the non-linearities by an inverted non-linearly network may naturally always be considered. But introducing of negative feed-back means something new as a principle and will be discussed in some different cases.

We imagine a relay station according to the first alternative i. e. consisting of a converter, an intermediate frequency amplifier, a demodulator, a video amplifier and a transmitter which can be modulated. It is previously known to use the transmitter also as local oscillator for the converter on the input side. This requires among other things that the difference between emitted and received frequency is equal to the intermediate frequency. The variations i. e. the modulation of the emitted and received signal are the same, and therefore their instantaneous frequencies are all the time at an almost constant frequency distance. There must, however, be a little difference in the variations, and this varying difference represents a considerably reduced swing but nevertheless a swing, which is amplified in the intermediate frequency amplifier, is demodulated and may modulate the transmitting tube. The reduced swing may be compensated by an increased amplification of the video amplifier. Thus, the difference in modulation between the emitted and received signal passes the intermediate frequency amplifier, the demodulator and the video amplifier, and controls the transmitter so that this difference will be as small as possible.

A relay station according to this principle represents, thus, a negative feed-back system with its improvement of the linearity characteristics but also with its stability difficulties. These difficulties will in reality limit the size of the negative feed-back at rather moderate values, as the negative feed-back circuit is involved and comprises many elements contributing to the phase shift, such as the intermediate frequency amplifier with many stages, the demodulator and the video amplifier. Owing to this limitation of the size of the possible negative feed-back the linearity cannot be made particularly high. A relay station of this kind, however, is very simple, but has the disadvantages that the emitted frequency must be different from the received frequency by the intermediate frequency, which determines the frequency levels, and that the swing decreases somewhat in every relay station, which decrease if there are many relay stations, may be considerable. If said limitations in the linearity are added to this, it is understood that this negative feed-back principle is not satisfactory to solve the problem regarding sufficiently distortionless transmission of a wide frequency band over many relay stations.

An object of the present invention is to avoid the difficulties following the above proposed direct negative feed-back, and the invention is mainly characterized by the part of the transmission system which lies between a certain point and the input comprising a frequency discriminator and the part, which lies between said point and the output comprising an oscillator which can be frequency modulated, the output of the converter device, at which output the difference between the input- and output signal of the transmission system is obtained, being connected to said point over a frequency discriminator.

Another advantage of a device according to the invention is that the negative feed-back circuit only comprises such devices, in which the amplitude of the signal is rather high. Thus the negative feed-back circuit need not comprise certain devices, the phase shift of which it is difficult to control. In these devices the signal is so low that the devices generally do not cause any distortion, and therefore a reduction of said distortion is not unavoidably necessary.

The invention will be described more in detail in connection with the enclosed drawings, where Fig. 1 shows the general embodiment of an arrangement according to the invention, Fig. 2 a particular embodiment, and Fig. 3 a relay station for transmission of frequency modulated signals in which the invention has been used.

Figures 2, 3:
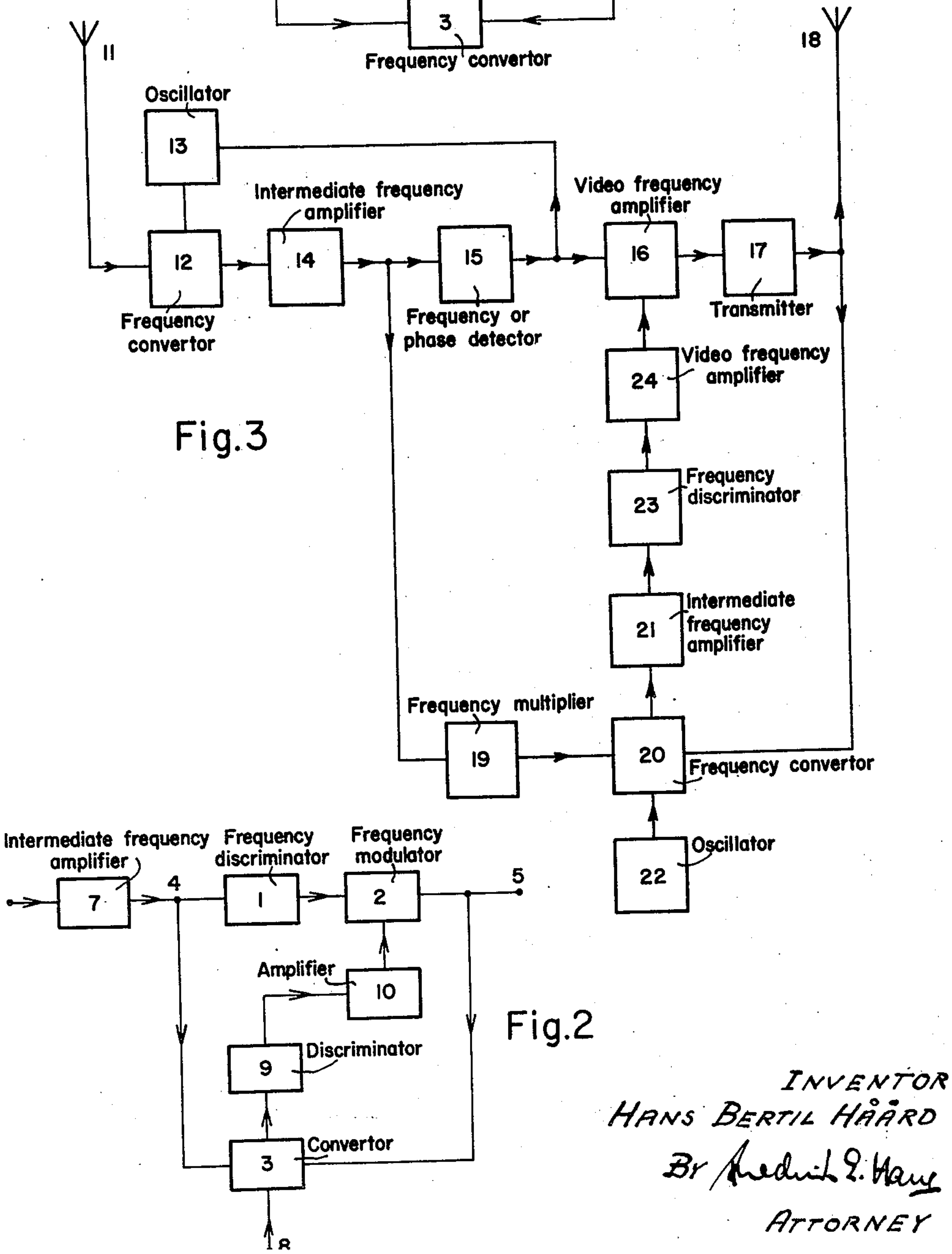

In Fig. 1, 1 and 2 represent a transmission system, the input of which is designated by 4 and the output by 5. A converting device is designated by 3, said device being connected both to the input 4 and the output 5, and besides to a point 6 in the transmission system 1, 2.

In the following below defined designations will be used:

$u_1$ the signal fed to point 4
$u_2$ the signal obtained in point 5
$F_1$ the transmission factor of the device 1
$F_2$ the transmission factor of the device 2
$F_3$ the transmission factor of the device 3

Generically it is valid that the output signal of the device is equal to its input signal multiplied by the transmission factor of the device. The output signal of the device 3 is equal to the difference between $u_1$ and $u_2$ multiplied by the transmission factor $F_3$ of the device 3.

Thus is obtained:

$$u_2=F_2(F_1u_1+F_3(u_1-u_2))$$

From this:

$$\frac{u_2}{u_1}=\frac{F_2(F_1+F_3)}{1+F_2F_3}\approx 1 \text{ if } F_3\gg F_1 \text{ and } F_3\gg\frac{1}{F_2}$$

More exactly there is obtained:

$$\frac{u_2}{u_1}=\frac{1+\frac{F_1}{F_3}}{1+\frac{1}{F_2\cdot F_3}}\approx 1+\frac{F_1}{F_3}-\frac{1}{F_2F_3}=1+\frac{1}{F_3}\left(F_1-\frac{1}{F_2}\right)$$

$F_1$ may suitably be chosen=

$$\frac{1}{F_2},\ \frac{u_2}{u_1}$$

then being equal to 1 and irrespective of $F_3$. Suppose now that the device 1 gives a certain distortion product, $\delta$ of the signal.

Then is obtained:

$$u_2=F_2(F_1u_1+\delta_1+F_3(u_1-u_2))$$

from which $$u_2=\frac{F_2((F_1+F_3)u_1+\delta_1)}{1+F_2\cdot F_3}=\frac{F_2(F_1+F_3)}{1+F_2\cdot F_3}\cdot u_1+\frac{F_2\delta_1}{1+F_2\cdot F_3}$$

and $$\frac{u_2}{u_1}\approx 1+\frac{1}{\frac{1}{F_2}+F_3}\cdot\frac{\delta_1}{u_1}$$

Now $F_3$ was $$\gg\frac{1}{F_2}$$

and if $F_3$ is chosen very great the relative distortion $$\frac{\delta_1}{u_1}$$

will be reduced to $F_3$ times.

Suppose now that the device 2 gives a certain distortion product $\delta_2$ of the signal.

Then is obtained:

$$u_2=\delta_2+F_2(F_1u_1+F_3(u_1-u_2))$$

from which $$u_2=\frac{F_2(F_1+F_3)}{1+F_2F_3}u_1+\frac{\delta_2}{1+F_2F_3}$$

and $$\frac{u_2}{u_1}1+\frac{1}{1+F_2F_3}\cdot\frac{\delta_2}{u_2}$$

Now $F_3$ was $$\gg\frac{1}{F_2}$$

and $F_3$ very great and therefore the relative distortion $$\frac{\delta_2}{u_2}$$

will also be reduced considerably.

When using the device for transmission of an amplitude modulated signal the transmission factors can represent the amplifications of the respective devices. The device may, however, also be used for transmission of frequency modulated signals for example. The signal $u_1$ then may consist of an intermediate frequency modulated signal and the device 1 mainly of a frequency discriminator. The transmission factor $F_1$ then has the dimension volt/c./sec. The device 2 consists mainly of a frequency modulator, and therefore the transmission factor $F_2$ has the dimension c./sec./volt.

Fig. 2 shows a device according to the invention in a relay station for transmission of frequency modulated signals. In the figure 7 represents an intermediate frequency amplifier, the output of which is connected to a discriminator 1. The output of said discriminator is in its turn connected to a frequency modulator 2, for example a microwave oscillator which can be frequency modulated, the output of which is designated by 5. The input signal of the discriminator 1 and the output signal of the oscillator 2 are transmitted to converter 3, to the input 8 of which at the same time a voltage of constant frequency is fed from a local oscillator, by means of which the difference between the input- and the output signals of the device 1, 2 can be put in a suitable frequency range to feed a discriminator 9. The output voltage from this discriminator is over an amplifier 10 fed to the oscillator 2. Thus, converter 3 serves as a mixing means mixing the output signal with the intermediate signal from the intermediate frequency amplifier 7.

The product of the transmission factor $F_1$ of the discriminator 1 and the transmission factor $F_2$ of the frequency modulated oscillator 2 may be chosen equal to 1. If thus the transmission factor of the oscillator 2 is equal to 1 mc./sec./volt the discriminator 1 may be dimensioned so, that its transmission factor is equal to 1 volt/mc./sec. The converter 3, the discriminator 9 and the amplifier 10 may be dimensioned so, that the transmission factor $F_3$ is considerably greater than $F_1$, for example of the size 100 volt/mc./sec. The distortion caused by the oscillator 2 will then owing to the negative feed-back be reduced about a hundred times. The distortion caused by the discriminator 1 will be compensated, so that this distortion is also reduced about a hundred times. If, however, the transmission system 1, 2 in every respect is free from distortion and is presumed to have constant amplification and phase shift, the discriminator 9 will not receive any voltage from the converter 3 and any compensation voltage will not be fed to the frequency modulator 2. In such a case the modulation of the input and the output signals are identical.

The devices included in the negative feed-back circuit will from the stability point of view have a phase shift, which can be readily controlled. The converter 3 and the frequency modulator 2 can thus easily be made with great band width. The frequency of the local oscillator may be some hundred mc./sec., and by selecting a suitable harmonnic to this frequency the frequency of the output signal received from the converter 3 will lie in such a frequency range, that the discriminator 9 is easy to dimension. The frequency of the oscillator 2 can for example be 2000 mc./sec., and the frequency of the intermediate frequency signal received from the intermediate frequency amplifier 7 can be 60 mc./sec.

The correction voltage, which is received from the device 3 can also for example be fed to a certain electrode on the transmitting tube, i. e. the transmission device 2.

Fig. 3 shows a relay station for transmission of frequency modulated signals, at which the invention has been used. The receiving antenna of the station is designated by 11, and the incoming frequency modulated signal is transmitted to a frequency converter 12 and is mixed there with a voltage from a local oscillator 13. The intermediate signal obtained from the converter is amplified in an intermediate frequency amplifier 14 and is then detected in a frequency- or phase detector 15. The detected video frequency signal is amplified in a video frequency amplifier 16 and is then fed to the transmitting part 17 of the station, where it may frequency modulate a transmission oscillator. The frequency modulated high frequency signal is then emitted over a transmitting antenna 18. The detected signal from the detector 15 is also supplied to the local oscillator 13, said local oscillator being frequency modulated in such a manner, that the frequency swing of the intermediate frequency signal is reduced. The intermediate signal with the thus reduced frequency swing is also supplied to a device 19, where it is frequency multiplied so many times that the frequency swing has about the same size as the frequency swing of the output signal from the transmitting antenna. The frequency multiplied signal is fed to a frequency converter 20, to which also a part of the outgoing signal is supplied. The difference frequency obtained in the converter 20 is supplied to an intermediate frequency amplifier 21, and suitable intermediate frequency can be obtained by supplying to the converter 20 further a suitably chosen frequency from a local oscillator 22. The voltage obtained from the intermediate frequency amplifier 21 is supplied to a detector 23 consisting of a frequency discriminator. The voltage is fed from the detector 23 to a video frequency amplifier 24. The voltage obtained from said amplifier is fed as a correction voltage to the video frequency amplifier 16 or possibly to the transmitting part 17.

The negative feed-back possible in the circuit with frequency negative feed-back is limited by the stability requirements. The circuit is rather involved and comprises many elements which cause phase shifts. Further the transmitted signal band is very wide. The negative feed-back may be irrespective of the frequency within the signal band, but this is difficult owing to said phase shifts. Therefore the negative feed-back tends to decrease in the upper part of the frequency band. This cannot be compensated by a suitably frequency dependent amplification in the video amplifier, as then there would be a distribution of the energy within the signal band which is unequal to the input and the output signals. The comparison in the converter 20 which is made between the input and the output signal would then not give the wanted result, as the swing in the signal coming from the intermediate frequency amplifier 14 to the converter 20 obtains another frequency dependance than that of the swing in the signal coming from the transmitting part to the converter 20. The negative feed-back which can be obtained in the circuit with frequency negative feed-back is therefore not so high. Suitable size of the negative feed-back is 3 to 4 times i. e. 10 to 12 db. A corresponding reduction of the distortion in the intermediate frequency amplifier is therefore obtained. Besides a corresponding reduction of the frequency swing in the intermediate frequency amplifier is obtained. At the swing reduction the second harmonic obtained owing to the phase distortion is reduced linearly with the swing and the third harmonic squarely with the swing. Therefore further a reduction of the second harmonic arisen in the intermediate frequency amplifier with 10 to 12 db is obtained and a reduction of the third harmonic with 20 to 24 db. Thus totally a reduction of the second harmonic arisen within the circuit with 20 to 24 db is obtained within the circuit with frequency negative feed-back at a negative feed-back of 10 to 12 db, and a reduction of the third harmonic with 30 to 36 db. By the frequency negative feed-back it is thus possible to reduce the intermodulation for a certain intermediate frequency amplifier or at maintained size of the intermodulation it is possible to use a more simple intermediate frequency amplifier.

Due to the signal emitted from the intermediate frequency amplifier 14 being frequency multiplied in the device 19 so many times, that its frequency swing is about equal to the frequency swing in the signal going out from the transmitting part 17, that the difference voltage, which the frequency converter 20 emits to the intermediate frequency amplifier 21, behind the video frequency amplifier 24, consists of a correction voltage of such a size and polarity, that the distortion in the detector 15, the video frequency amplifier 16 and the transmitting part 17 is reduced. The distortion in the intermediate frequency amplifier 21, the detector 23 and the video frequency amplifier 24 is thus a distortion of a very small correction signal and is therefore negligible in comparison with the main signal in the video frequency amplifier 16. If on the other hand the signal emitted from the intermediate frequency amplifier 14 had not been frequency multiplied with the above mentioned value, the signal emitted from the converter 20 would behind the video frequency amplifier 24 be of the same size as the signal in the video frequency amplifier 16. The distortion in the intermediate frequency amplifier 21, the detector 23 and the video frequency amplifier 24 would then with almost its full value be present in the output signal.

The invention thus causes a considerable reduction of the intermodulation in a relay station for transmission of frequency modulated signals and is naturally also available at relay stations for transmission of phase modulated signals.

The above mentioned frequency multiplication has hitherto been assumed to take place in a device 19, situated between the intermediate frequency amplifier 14 and the converter 20. The frequency multiplication may, however, also take place in the converter 20 in such a manner, that the signal emitted from the transmitter 17 in the converter 20 is mixed with a suitable harmonic of the signal from the intermediate frequency amplifier 14 in said converter, so that above mentioned conditions for equal frequency swing are fulfilled.

I claim:

1. A relay station for transmitting frequency modulated signals, comprising local oscillating means, mixing means mixing an incoming frequency modulated signal with the voltage of said local oscillating means, intermediate frequency amplifying means, frequency detecting means, video frequency amplifying means, emitting means for emitting an output signal, a point between said detector means and said emitting means being connected to said local oscillating means to form an envelope feed-back circuit, distortion reducing means including a second mixing means mixing said output signal with the intermediate signal from said intermediate frequency amplifying means, a second detecting means detecting the output of said second mixing means, the output of said second detecting means being connected to a point between said first detecting means and the output of said emitting means, and means for frequency multiplying the intermediate signal fed to said second mixing means by a factor such that the frequency swing of the signal applied to said second mixing means from the intermediate frequency amplifying means is substantially the same as the frequency swing of the output signal of the emitting means.

2. A relay station for transmitting phase modulated signals, comprising local oscillating means, mixing means mixing an incoming phase modulated signal with the voltage of said local oscillating means, intermediate frequency amplifying means, phase detecting means, video frequency amplifying means, emitting means for emitting an output signal, a point between said detector means and said emitting means being connected to said local oscillating means to form an envelope feed-back circuit, distortion reducing means including a second mixing means for mixing said output signal with the intermediate signal from said intermediate frequency amplifying means, a second detecting means for detecting the output of said second mixing means, the output of said second detecting means being connected to a point between said first detecting means and the output of said emitting means, and means for frequency multiplying the intermediate signal fed to said second mixing means by a factor such that the phase swing of the signal applied to said second mixing means from the intermediate frequency amplifying means is substantially the same as the phase swing of the output signal of the emitting means.

References Cited in the file of this patent

UNITED STATES PATENTS

| | | |
|---|---|---|
| 2,148,532 | Chaffee | Feb. 28, 1939 |
| 2,407,212 | Tunick | Sept. 3, 1946 |
| 2,614,211 | Goodall | Oct. 14, 1952 |
| 2,659,813 | Schelleng | Nov. 17, 1953 |
| 2,777,054 | Dahlberg | Jan. 8, 1957 |

FOREIGN PATENTS

| | | |
|---|---|---|
| 653,288 | Great Britain | May 9, 1951 |